US012000514B2

(12) United States Patent
Garton et al.

(10) Patent No.: US 12,000,514 B2
(45) Date of Patent: Jun. 4, 2024

(54) SYSTEMS AND METHODS FOR A FLOATING QUICK DISCONNECT IN LIQUID COOLING

(71) Applicant: Microsoft Technology Licensing, LLC, Redmond, WA (US)

(72) Inventors: Chadd Nathaniel Garton, Woodinville, WA (US); David William Mayer, Woodinville, WA (US); Martha Geoghegan Peterson, Woodinville, WA (US); Robert Jason Lankston, II, Woodinville, WA (US); Xudong Tang, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/361,271

(22) Filed: Jun. 28, 2021

(65) Prior Publication Data
US 2022/0412493 A1    Dec. 29, 2022

(51) Int. Cl.
*F16L 37/22*    (2006.01)
*F16L 37/34*    (2006.01)

(52) U.S. Cl.
CPC ............. *F16L 37/22* (2013.01); *F16L 37/34* (2013.01)

(58) Field of Classification Search
CPC . F16L 37/32; F16L 37/35; F16L 37/34; F16L 37/40; F16L 37/413; F16L 37/42
See application file for complete search history.

(56) References Cited

U.S. PATENT DOCUMENTS 2,935,338 A      5/1960  Mills, Jr.
2,962,303 A  *  11/1960  Ramberg ................ F16L 37/36
                                                            137/614.04

(Continued)

FOREIGN PATENT DOCUMENTS

GB         607340 A      8/1948
GB        2199625 A      7/1988

(Continued)

OTHER PUBLICATIONS

"International Search Report and Written Opinion Issued in PCT Application No. PCT/US22/029941", dated Aug. 26, 2022, 9 Pages.

*Primary Examiner* — Hailey K. Do
(74) *Attorney, Agent, or Firm* — RAY QUINNEY & NEBEKER P.C.; Paul N. Taylor

(57) ABSTRACT

A quick disconnect system includes a housing and a first connector of a quick disconnect configured to complementarily mate with a second connector of the quick disconnect. A pre-loaded biasing element is configured to provide a biasing force between the first connector and the housing. A method for mating a quick disconnect is also described. The method includes receiving a connecting force to mate a first connector of a quick disconnect in a housing with a second connector of the quick disconnect. When the connecting force is at least equal to or greater than a mating force value, the first connector is mated with the second connector. When the connecting force is greater than a pre-load value of a biasing element in the housing, the mated quick disconnect is moved relative to the housing while maintaining the connection of the mated quick disconnect.

21 Claims, 9 Drawing Sheets

(56) References Cited

U.S. PATENT DOCUMENTS

| | | | | |
|---|---|---|---|---|
| 3,168,335 | A * | 2/1965 | Sumption | F16L 37/32 |
| | | | | 285/70 |
| 4,139,222 | A * | 2/1979 | Loland | F16L 33/221 |
| | | | | 285/12 |
| 4,886,301 | A * | 12/1989 | Remsburg | F16L 37/56 |
| | | | | 285/39 |
| 4,890,642 | A * | 1/1990 | Smazik | F16L 29/04 |
| | | | | 251/339 |
| 6,592,387 | B2 | 7/2003 | Komenda et al. | |
| 7,513,788 | B2 | 4/2009 | Camelio | |
| 7,639,499 | B1 | 12/2009 | Campbell et al. | |
| 9,351,428 | B2 | 5/2016 | Eckberg et al. | |
| 10,609,840 | B2 | 3/2020 | Gao et al. | |
| 2007/0051912 | A1* | 3/2007 | Arosio | F16L 37/413 |
| | | | | 251/149.6 |
| 2007/0246108 | A1* | 10/2007 | Conway | F16L 37/34 |
| | | | | 137/614.06 |

FOREIGN PATENT DOCUMENTS

| | | | |
|---|---|---|---|
| JP | 2006307992 A | | 11/2006 |
| JP | 2013002502 A | * | 1/2013 |

* cited by examiner

Linear force vs. displacement

Exponential force vs. displacement

Variable force vs. displacement curve example 1

Variable force vs. displacement curve example 2

SYSTEMS AND METHODS FOR A FLOATING QUICK DISCONNECT IN LIQUID COOLING

BACKGROUND

Quick connect and quick disconnect systems are utilized in a variety of industries, including automotive, medical, hydraulic, household, and industrial. One application for quick disconnect is automotive nozzles and hoses for fuel delivery. Another example application for quick disconnect systems is hydraulically powered tools and machines, like sawing and cutting tools. Yet another example application for quick disconnect systems is thermal management in electrical systems. Many applications are operated by hand to connect and disconnect the quick disconnect systems and therefore can be manually adjusted as needed. In some quick disconnect systems however, the quick disconnect parts are fixed to other elements creating a need for specific tolerance limits for connecting and disconnecting the quick disconnect systems as specified in more detail below.

The subject matter claimed herein is not limited to implementations that solve any disadvantages or that operate only in environments such as those described above. Rather, this background is only provided to illustrate one exemplary technology area where some implementations described herein may be practiced.

BRIEF SUMMARY

In some embodiments, an apparatus includes a housing having a front-part and a back-part, a first connector of a quick disconnect fluid conduit oriented toward the front-part of the housing and a pre-loaded biasing element disposed in the housing to apply a biasing force between the housing and the first connector of the quick disconnect, wherein the pre-loaded biasing element is configured to allow the first connector of the quick disconnect to move relative to the housing.

In other embodiments, a method for mating a quick disconnect is provided, receiving a connecting force to mate a first connector of a quick disconnect in a housing with a second connector of the quick disconnect, when the connecting force is at least equal to a mating force value, connecting the first connector of the quick disconnect with the second connector of the quick disconnect, and when the connecting force is greater than a pre-load value of a biasing element in the housing, connecting the first connector of the quick disconnect with the second connector of the quick disconnect thereby forming a mated quick disconnect, and wherein the mated quick disconnect moving relative to the housing while maintaining the connection with the mated quick disconnect.

In yet other embodiments, a system for forming a connection in a server rack includes a first connector of a quick disconnect configured in a housing, a second connector of the quick disconnect complementary configured to mate with the first connector of the quick disconnect to form a mated quick disconnect, and a pre-loaded biasing element positioned between the first connector of the quick disconnect and the housing, wherein the force provided by the pre-loaded biasing element is no less than mating force between the first connector of the quick disconnect and the second connector of the quick disconnect.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 2-1 is a plan view of a quick disconnect system when disconnected, according to at least some embodiments of the present disclosure;

FIG. 2-2 is a plan view of the quick disconnect system of FIG. 2-1 when fully mated, according to at least some embodiments of the present disclosure;

FIG. 2-3 is a plan view of the quick disconnect system of FIG. 2-2 moved relative to the housing, according to at least some embodiments of the present disclosure;

FIG. 3 is a cross sectional view of a mated quick disconnect, according to at least some embodiments of the present disclosure;

FIG. 6-1 is an example of pre-loaded biasing element having a linear force vs. displacement curve, according to at least some embodiments of the present disclosure;

FIG. 6-2 is an example of pre-loaded biasing element having an exponential force vs. displacement curve, according to at least some embodiments of the present disclosure;

FIG. 6-3 is an example of pre-loaded biasing element having a first type of variable force vs. displacement curve, according to at least some embodiments of the present disclosure;

FIG. 6-4 is an example of pre-loaded biasing element having a second type of variable force vs. displacement curve, according to at least some embodiments of the present disclosure;

DETAILED DESCRIPTION

Figure 1:
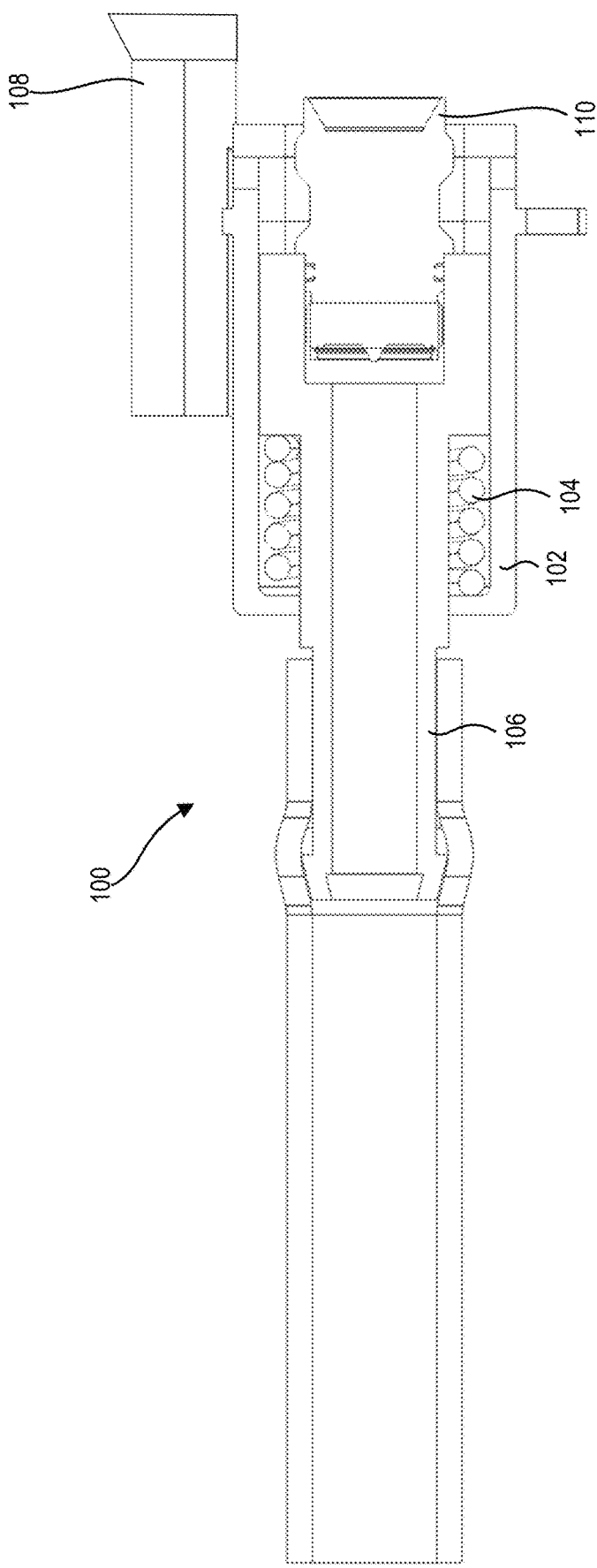
FIG. 1 is a cross-sectional view of a connector assembly, according to at least some embodiments of the present disclosure.

This disclosure generally relates to quick disconnect systems, guiding systems, and methods of use. More particularly, this disclosure generally relates to quick disconnect systems being movable relative to their housing. In some embodiments a first connection assembly comprises a housing, a first connector of a quick disconnect and a pre-loaded biasing element disposed in the housing to apply a biasing force between the housing and the first connector of the quick disconnect. The first connector of the quick disconnect may be configured to a housing. For example, the housing may be casted to surround the first connector of the quick disconnect or it may be a sheet metal bracket. The housing may then be fixed into a server rack or a server chassis. In another embodiment, the housing is the server rack or the server chassis.

Conventional quick disconnect systems include a first connector and a second connector. The first connector is configured to mate with the second connector. Conventionally, one of the connectors is a female and the other is a male protrusion. In systems where the quick disconnect is configured for fluid connections, one of the connectors typically includes a valve that terminates the flow of fluid once the first connector is disconnected from the second connector.

A conventional server rack, such as adhering to the EIA (Electronic Industries Association) standard is approximately 600 millimeters (mm) wide, 1,200 mm deep and 500 mm tall, can include various quantities of rack units or chassis. Other standards include 1067 mm deep or 1000 mm deep. The computing devices supported by these types of server racks typically produce a significant amount of heat, and the precise amount of heat depends on the number of server computers included in a rack and the type and workload of the server computers. This heat can affect the performance of and/or damage the electronics inside the server rack, thus various cooling methods are needed. Air cooling with on-chip heat sinks and remote heat sinks become unfeasible with higher power chips which produce more heat than lower power chips. Direct contact liquid cooling (DCLC) provides a better thermal solution for situations where air cooling becomes inefficient. The DCLC technology can use quick disconnect couplings to allow individual chassis or servers to be removed for servicing and for easier assembly.

In some embodiments, a first connector of the quick disconnect is fixed to the rack, while a second connector of the quick disconnect is fixed to the chassis. The racks may have a depth tolerance of up to ±7 mm from specified dimensions, which may be more than the tolerance allowed by quick disconnect assembly, the latter conventionally being ±1 mm. The difference in permissible tolerance standards creates a potential fitment issue for DCLC systems even when parts are meeting specifications. If the dimensions of the rack are bigger than specified, the first connector and the second connector may not fully mate when the chassis is pushed inside the rack, which may cause increased pressure drop and/or decreased flow of fluids in the system. If the dimensions of the rack are smaller than specified, the first connector and the second connector may exceed their limits which may bend or break the quick disconnect system. Even if the rack and/or connector meets the tolerance specification, one or more of the problems described above may happen if too much or not enough force is applied to insert the chassis in the rack.

Even if the rack and/or connector meets the tolerance specification, there may be danger of misalignment of the quick disconnect in x- and/or y-dimensions when placing the chassis inside the rack, which may prevent the first connector and/or the second connector from mating.

FIG. 1 is a cross sectional view of a first connection assembly 100 according to an embodiment of the present disclosure. The first connection assembly 100 may include a housing 102, a first connector 106 of a quick disconnect and a pre-loaded biasing element 104. In some embodiments, the first connection assembly 100 also includes a first guiding element 108. The first connector 106 of a quick disconnect may be oriented towards the front-part of the housing 102.

The pre-loaded biasing element 104 may be disposed in the housing 102 to apply a biasing force between the housing 102 and the first connector 106 of the quick disconnect. The pre-loaded biasing element 104 may be further configured to allow the first connector 106 of the quick disconnect to move relative to the housing 102. In FIG. 1, the pre-loaded biasing element 104 is illustrated as a coil spring, however, it should be appreciated that other type of pre-loaded biasing element may be used. For example, the pre-loaded biasing element 104 may be a compression spring, extension spring, torsion spring, constant force spring, coil spring, leaf spring, or other type of spring. In another embodiment, the pre-loaded biasing element 104 includes a magnet. In yet another embodiment, the pre-loaded biasing element 104 includes a compressible gas. A valve 110 in the first connector 106 selectively allows fluid flow through the first connector 106 when a second connector is in contact with and/or mated to the first connector 106.

Figures 1, 2:
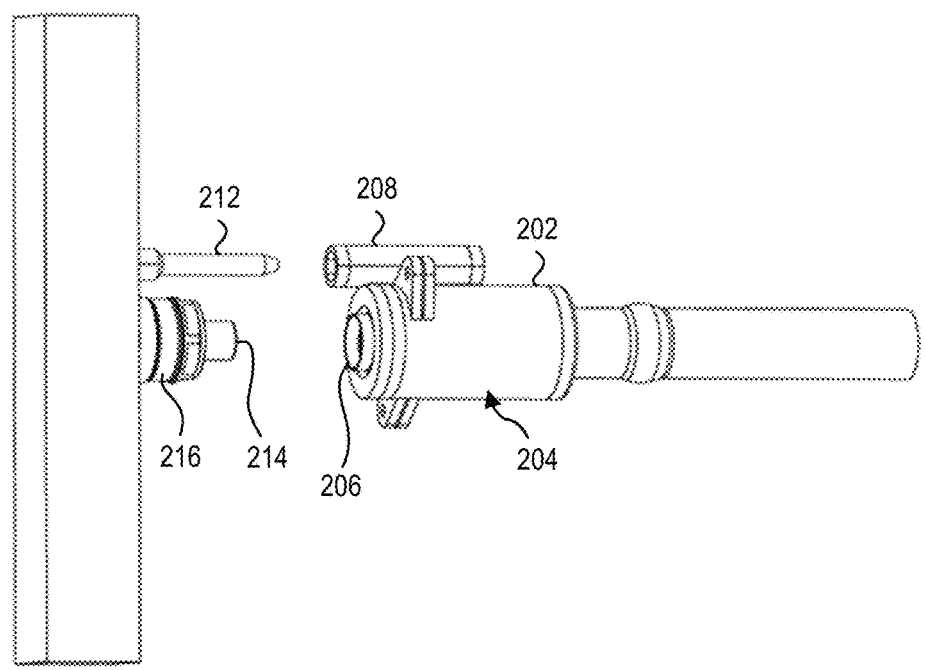
Figure 2:
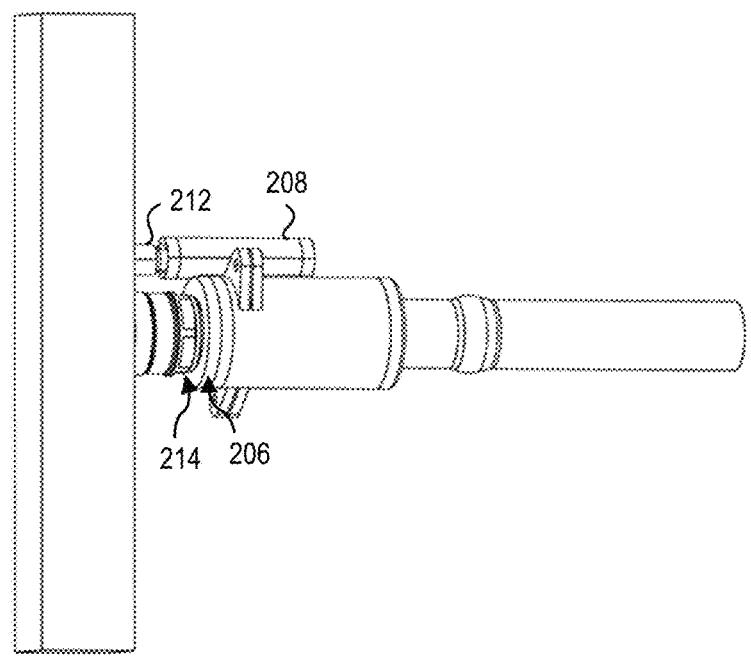
Figures 2, 3:
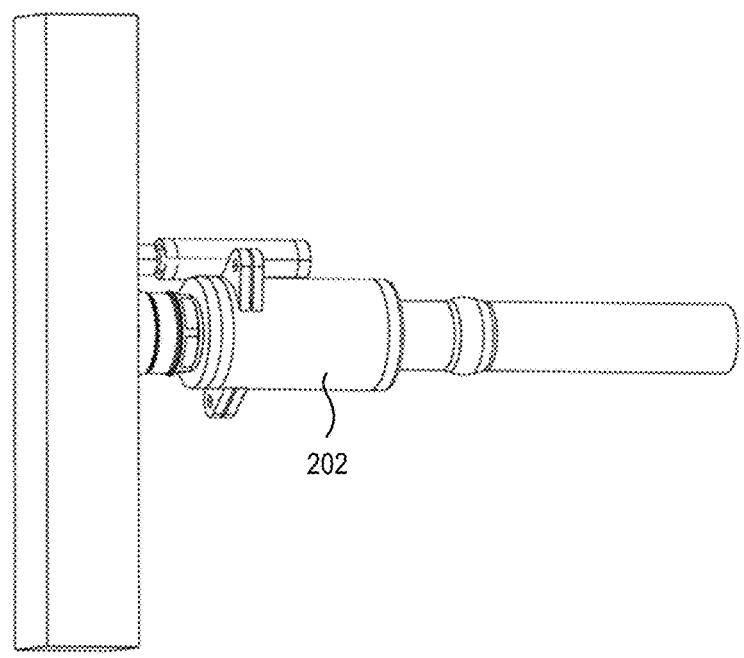
Figure 3:
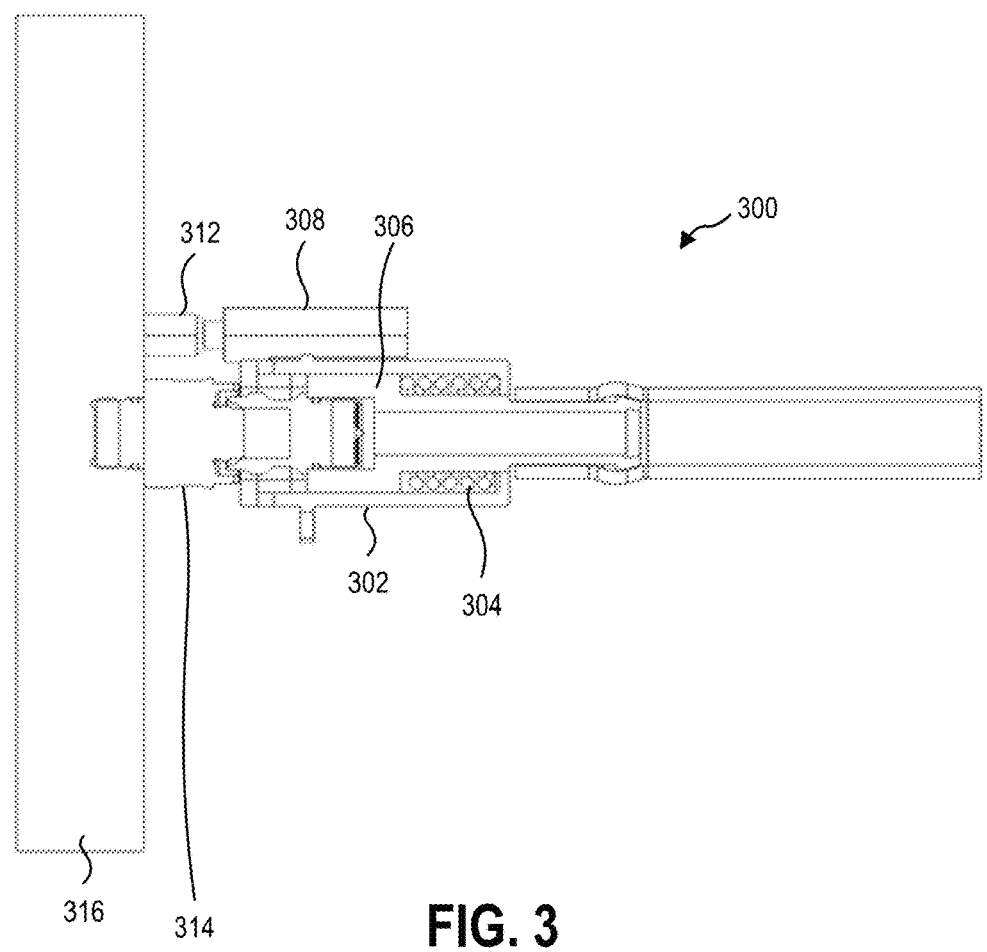

FIG. 2-1 through 2-3 are a plan view of a mating process of first connector 206 of a quick disconnect and a second connector 214 of a quick disconnect according to an embodiment of the present disclosure. The first connector 206 may be positioned in a first housing 202 including a first guiding element 208. The first housing 202 may be cast or molded to surround the first connector 206, or the first housing 202 may be a sheet metal bracket. A pre-loaded biasing element in the first housing 202 applied a biasing force to the first connector 206 toward the open end of the first housing 202. The second connector 214 may be configured in a second housing 216 including a second guiding element 212. The first connector 206 may be female and the second connector 214 may be a male protrusion or vice versa. In some embodiments, the first connection assembly and second connection assembly have a plurality of guiding element pairs to limit and/or prevent binding during mating.

The first connector 206 may be configured to complementarily mate with a second connector 214 to form a fluid conduit through the first connector 206 and the second connector 214. In FIG. 2-2, the first connector 206 and the second connector 214 have fully mated, and the first guiding element 208 and the second guiding element 212 have fully mated. In FIG. 2-3, the mated quick disconnect including the first connector 206 and the second connector 214 have moved relative the housing 202 by deforming or displacing at least part of the biasing element.

FIG. 3 is a cross sectional view of a first connection assembly 300 mating with a second connector 314 according to the present disclosure. The first connection assembly 300 may include a housing 302, a first connector of a quick disconnect 306, and a pre-loaded biasing element 304. In some embodiments, the first connection assembly 300 includes a first guiding element 308. The first connector 306 may be oriented towards the front-part of the housing 302. The pre-loaded biasing element 304 may be disposed in the housing 302 to apply a biasing force between the housing 302 and the first connector 306. The pre-loaded biasing element 304 may be further configured to allow the first connector 306 to move relative to the housing 302. The second connector 314 is configured to complementarily mate with the first connector 306. In some embodiments, the first connection assembly 300 additionally includes a first guiding element 308 configured to complementarily mate with a second guiding element 312 disposed in a second housing 316.

The pre-loaded biasing element 304 may have a preload value greater than the mating force value, in which case the first connector of the quick disconnect 306 and the second connector of the quick disconnect 314 may fully mate, when a connecting force is applied, before the pre-loaded biasing element 304 may allow the fully mated quick disconnect to move relative to the housing 302.

The pre-load value of the biasing element 304, in some embodiments, is less than the mating force value, wherein the applied connecting force, at first, moves the first connector 306 relative to the housing 302 until the biasing force reaches a value that is greater than the mating force value, at which point the first connector 306 and the second connector 314 will mate. Any additional force applied to this system, after the first connector 306 and the second connector 314 have fully mated, may then further move the mated quick disconnect system relative to the housing 302.

In some embodiments, the biasing element 304 has a predetermined wipe threshold value. The wipe threshold value is a displacement in the longitudinal direction of the biasing element 304. As the first connector 306 moves relative to the housing 302 before mating with the second connector, the biasing element 304 compresses. As the biasing element 304 compresses, a biasing force provided by the biasing element 304 increases. In some embodiments, the biasing force may increase linearly, non-linearly, exponentially, variably, etc. as will be described in more detail in relation to FIG. 6-1 through FIG. 6-4. The wipe threshold value is the displacement of the first connector 306 relative to the housing 302, and hence the compression of the biasing element 304, at which point the biasing force is equal to the mating force value of the quick disconnect, causing the quick disconnect to mate. In at least one example, the wipe threshold value is the amount of wipe of the quick disconnect at which the quick disconnect mates.

In some embodiments, the wipe threshold value is in a range having an upper value, a lower value, or upper and lower value including any of 1 mm, 2 mm, 3 mm, 4 mm, 5 mm, 7.5 mm, 10 mm, or any values therebetween. In some examples, the wipe threshold value is greater than 1 mm. In some examples, the wipe threshold value is less than 10 mm. In some examples, the wipe threshold value is between 1 mm and 10 mm. In at least one example, the wipe threshold value is less than 2.5 mm.

Figure 4:
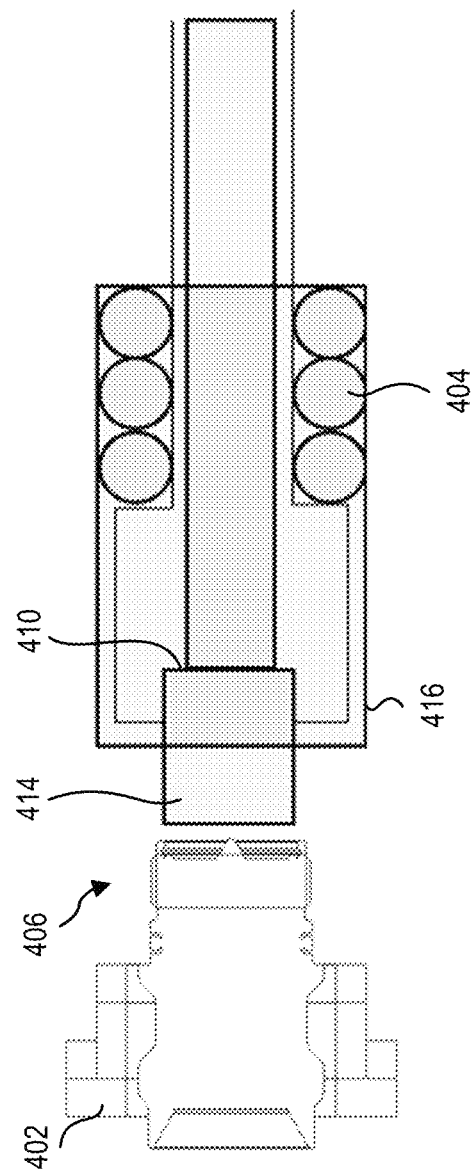
FIG. 4 is a cross-sectional view of a quick disconnect including a pre-loaded biasing element disposed in the second housing, according to at least some embodiments of the present disclosure.

FIG. 4 is a cross-sectional view of a quick disconnect including a pre-loaded biasing element disposed in the second housing. The pre-loaded biasing element 404 may be disposed in the second housing 416 such that a second biasing force is applied between the second housing 416 and the second connector 414 of the quick disconnect. In some embodiments, the first housing 402 and/or first connector 406 include a valve that controls a fluid flow. In some embodiments, the second connector 414 includes a valve 410 that controls the fluid flow. In some embodiments, both the first connector 406 and the second connector 414 include a valve (e.g., valve 410) that controls the fluid flow. The valve 410 may be configured to open when the first connector 406 and the second connector 414 mate. For example, the valve 410 may open fully when the first connector 406 and the second connector 414 fully mate, and the valve 410 may open partially when the first connector 406 and the second connector 414 mates partially. When the first connector 406 and second connector 414 are disconnected from one another, the valve 410 may close to prevent fluid loss.

Figure 5:
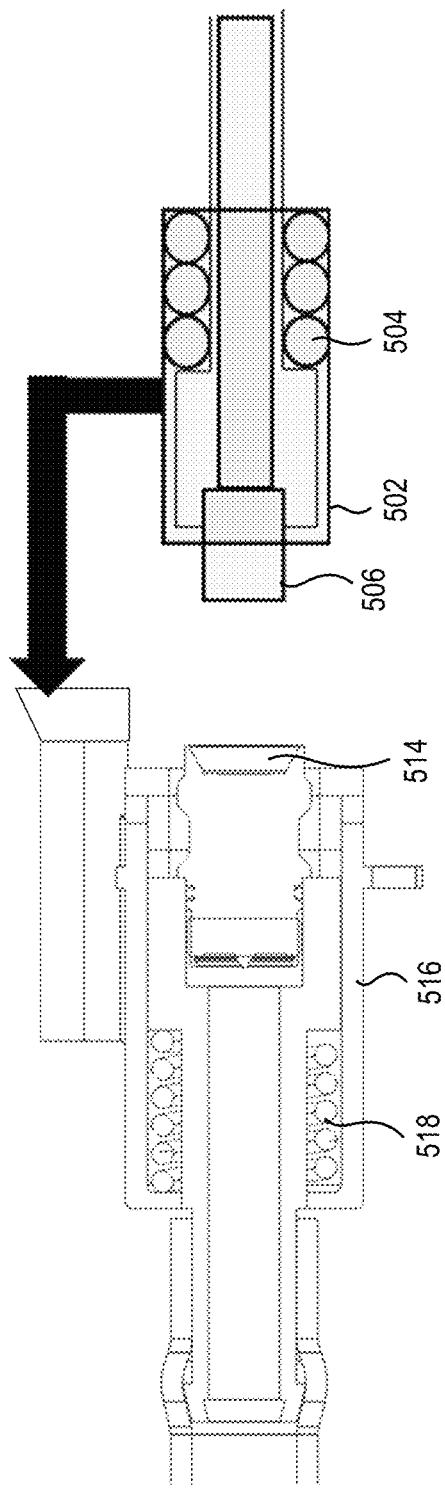
FIG. 5 is a cross-sectional view of a quick disconnect including a pre-loaded biasing element disposed in both the first housing and the second housing, according to at least some embodiments of the present disclosure.

FIG. 5 is a side cross-sectional view of an embodiment wherein a pre-loaded biasing element 504, 518 is disposed in both the first housing 502 and the second housing 516. The pre-load value of the first biasing element 504 in the first housing 502 may be greater than the pre-load value of the second biasing element 518 in the second housing 516 allowing the second connector 514 of the quick disconnect to move relative to the second housing 516 until the biasing force of the second biasing element 518 becomes equal to or greater than the pre-load value of the first biasing element 504. At that point, the first connector 506 of the quick disconnect may move relative to the first housing 502, as well.

Figures 1, 6:
Figures 2, 6:
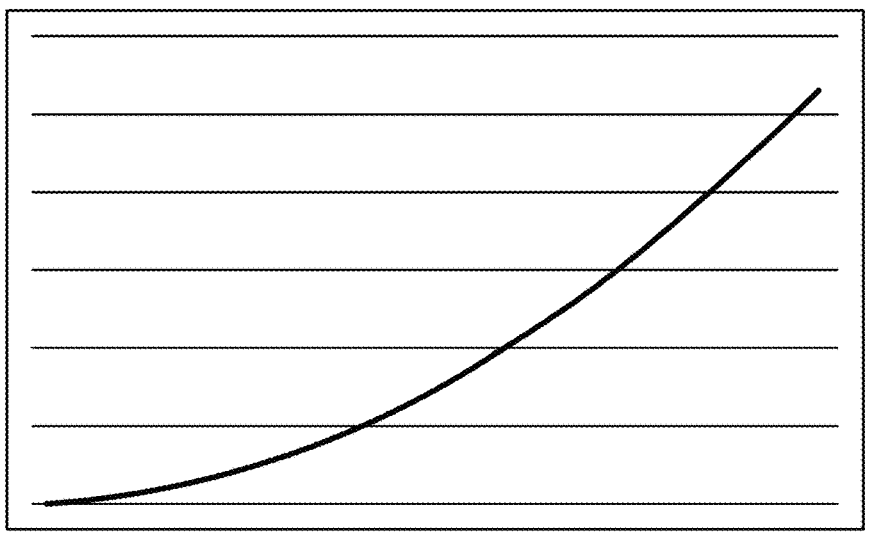
Figures 3, 6:
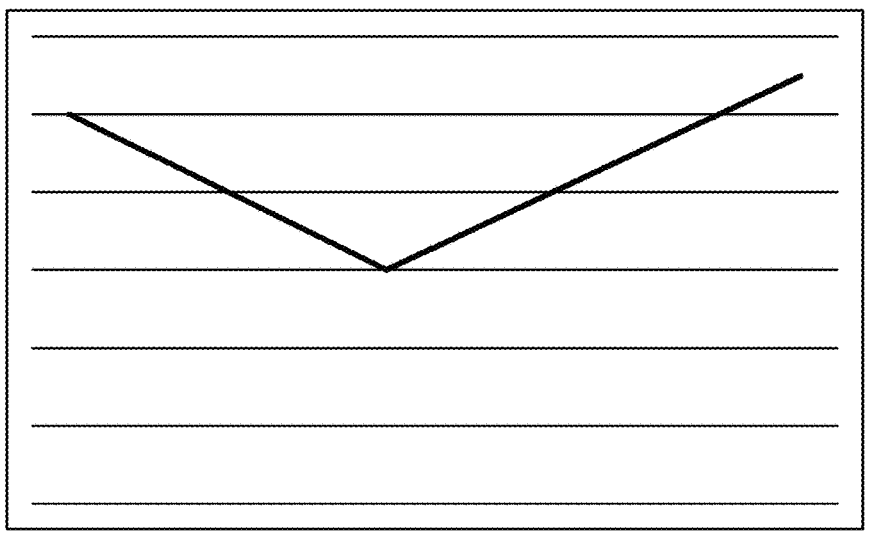
Figures 4, 6:
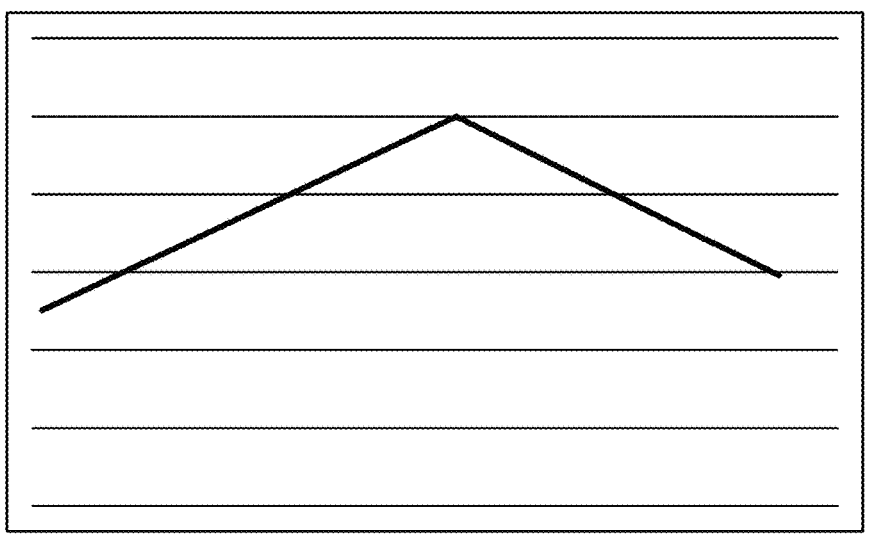

FIGS. 6-1, 6-2, 6-3, and 6-4 show various force vs displacement curves for embodiments of pre-loaded biasing elements according to the present disclosure. In FIG. 6-1, the embodiment of a pre-loaded biasing element has a linear force vs. displacement curve. The biasing force of the biasing element increases linearly as the first connector of the quick disconnect moves relative to the housing. In FIG. 6-2, the embodiment of a pre-loaded biasing element has an exponential force vs. displacement curve. The biasing force of the biasing element increases exponentially as the first connector of the quick disconnect moves relative to the housing. In FIG. 6-3, the embodiment of a pre-loaded biasing element has a variable force vs. displacement curve, wherein the biasing force may first decrease and then increase as the first connector of the quick disconnect moves relative to the housing. In FIG. 6-4, the embodiment of a pre-loaded biasing element has a different variable force vs. displacement curve, wherein the biasing force may first increase and then decrease as the first connector of the quick disconnect moves relative to the housing.

Figure 7:
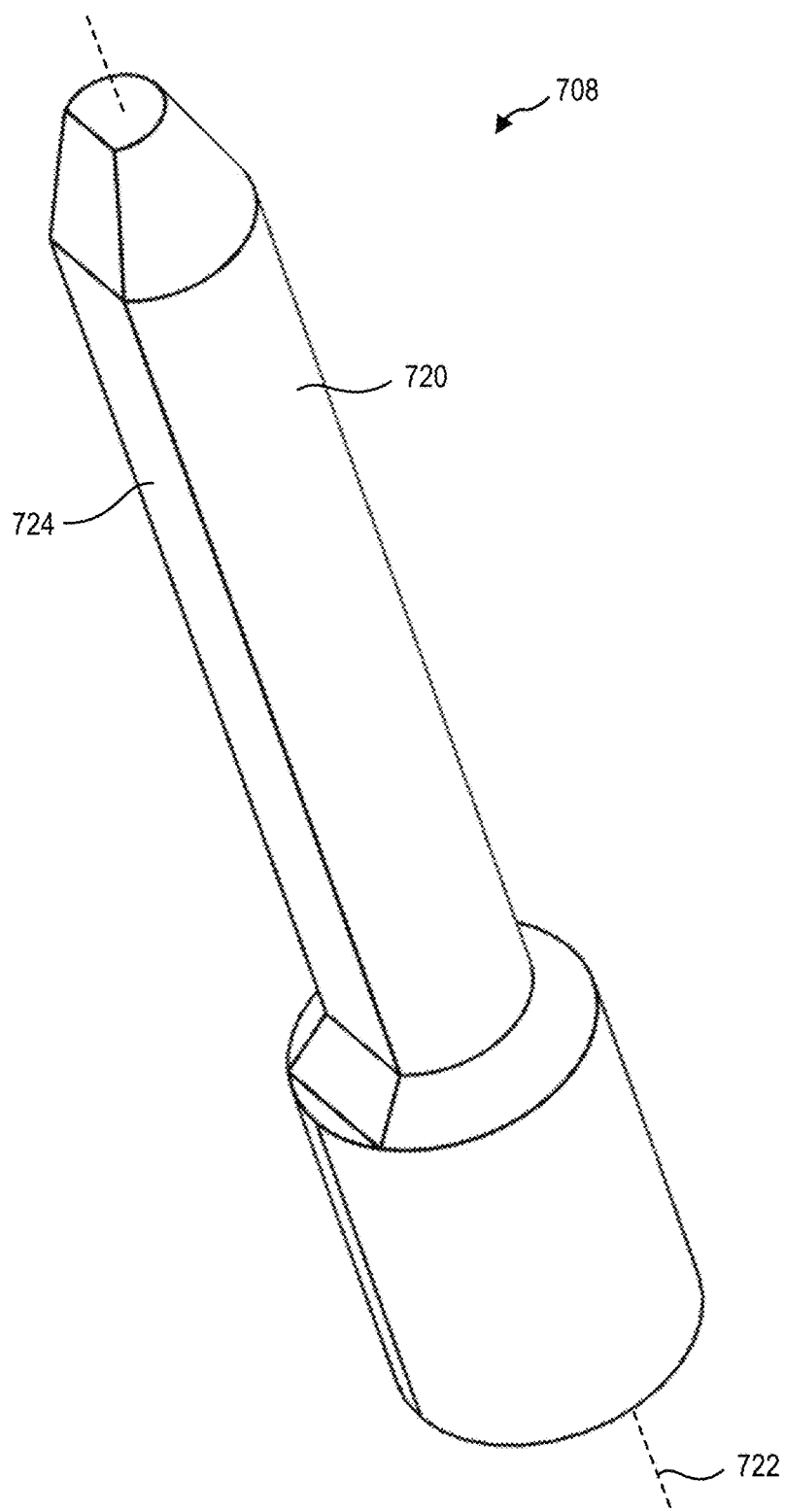
FIG. 7 shows an asymmetrical guide pin, according to at least some embodiments of the present disclosure.

FIG. 7 shows an asymmetrical guide pin according to the present disclosure. In one embodiment, the first guiding element 708 is a guide pin having a rotationally asymmetric surface for preventing any rotational movement and/or movement in x- and y-axis. For example, the guide pin may have a body 720 that is mostly cylindrical with a flat surface 724 parallel to a direction of the longitudinal axis 722. A complementary guide hole (not shown) may have a complementary transverse cross-sectional shape (e.g., on an inner surface thereof) in the transverse direction to the longitudinal axis 722 of the guide pin.

Figure 8:
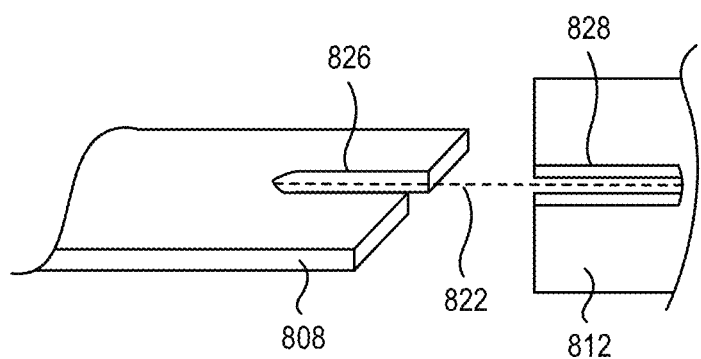
FIG. 8 is a perspective view of complementary guiding elements, according to at least some embodiments of the present disclosure.

FIG. 8 is a perspective view of another embodiment of complementary guiding elements 808, 812. The first guiding element 808 and second guiding element 812 include longitudinal slots 826, 828 configured to allow movement along a longitudinal axis 822 of the guiding elements 808, 812 relative to one another. The transversely oriented bodies of the first guiding element 808 and second guiding element 812 limit and/or prevent the transverse and/or rotational movement of the first guiding element 808 and second guiding element 812 relative to one another.

INDUSTRIAL APPLICABILITY

This disclosure generally relates to quick disconnect systems, guiding systems, and methods of use. More particularly, this disclosure generally relates to quick disconnect systems being movable relative to their housing. In some embodiments a first connection assembly comprises a housing, a first connector of a quick disconnect and a pre-loaded biasing element disposed in the housing to apply a biasing force between the housing and the first connector of the quick disconnect. The first connector of the quick disconnect may be configured to a housing. For example, the housing may be casted to surround the first connector of the quick disconnect or it may be a sheet metal bracket. The housing may then be fixed into a server rack or a server chassis. In another embodiment, the housing is the server rack or the server chassis.

In some embodiments according to the present disclosure, the first connector of the quick disconnect may be configured to complementarily mate with a second connector of the quick disconnect to form a fluid conduit through the first connector of the quick disconnect and the second connector of the quick disconnect. In some embodiments, the first connector of the quick disconnect is a male protrusion extending out of the housing and the second connector of the quick disconnect is female. In some embodiments, the first connector of the quick disconnect is female, and the second connector of the quick disconnect is a male protrusion.

In some embodiments, the first connector includes a valve that controls the fluid flow. In some embodiments, the second connector includes a valve that controls the fluid flow. In some embodiments, both first connector of the quick disconnect and second connector of the quick disconnect include a valve. The valve may be operated to open when the first connector of the quick disconnect and the second connector of the quick disconnect mate. For example, the valve may open fully when the first connector of the quick disconnect and the second connector of the quick disconnect fully mate, and the valve may open partially when the first connector of the quick disconnect and the second connector of the quick disconnect mate partially.

In some embodiments, the quick disconnect includes a pre-loaded biasing element that allows movement of one or more of the connectors when an applied force exceeds a pre-load value of the pre-loaded biasing element. In some embodiments, the pre-loaded biasing element is a spring. For example, the pre-loaded biasing element may be a compression spring, extension spring, torsion spring, constant force spring, coil spring, leaf spring, or other type of spring. In one embodiment, the pre-loaded biasing element is a pre-compressed spring positioned between the back-part of a housing and the first connector of the quick disconnect. In another embodiment, a pre-loaded biasing element is a pre-extended spring positioned between the front-part of the housing and the first connector of the quick disconnect. In both examples, the pre-loaded biasing element applies a force to the connector toward the first end of the housing.

The pre-loaded biasing element may have a pre-load value equal or greater than a mating force value. The pre-load value is the amount of force the pre-loaded biasing element applies to the connector relative to the housing. In some embodiments, the pre-load value is in a range having an upper value, a lower value, or upper and lower values including any of 50 Newtons (N), 75 N, 100 N, 110 N, 120 N, 130 N, 140 N, 150 N, or more. For example, the pre-load value may be greater than 50.0 N. In some examples, the pre-load value may be less than 150.0 N. In some examples, the pre-load value may be between 50.0 N and 150.0 N.

The mating force value is the amount of force needed to connect the first connector to the second connector. For example, the male and female connectors of the quick disconnect may have a snap fit connection that engages and becomes liquid-tight after a linear application of the mating force value. In some embodiments, the mating force value is in a range having an upper value, a lower value, or upper and lower values including any of 50 N, 75 N, 100 N, 110 N, 120 N, 130 N, 140 N, 150 N, or more. For example, the mating force value may be greater than 50.0 N. In some examples, the mating force value may be less than 150.0 N. In some examples, the mating force value may be between 50.0 N and 150.0 N. In at least one example, the force required to mate a quick disconnect with a coolant pressure of 20 pounds per square inch is approximately 114.4 N.

The pre-loaded biasing element may have a longitudinal range of motion to accommodate any tolerance issues in the system. For example, the pre-loaded biasing element may allow the first connector of the quick disconnect to move up to 7 mm relative to the housing. The biasing element may provide a biasing force that changes based on relative longitudinal position of the housing and the first connector in the longitudinal range of motion. In some embodiments, the pre-loaded biasing element has a linear biasing force vs. displacement curve. For example, the pre-loaded biasing element may follow Hooke's law and exhibit a linear force response to displacement along a longitudinal axis of the pre-loaded biasing element. In some embodiments, the pre-loaded biasing element has an exponential biasing force vs. displacement curve. For example, the pre-loaded biasing element may include a progressive spring, a compressible gas, or other material that causes the force generated by the pre-loaded biasing element to increase exponentially relative to the displacement along a longitudinal axis of the pre-loaded biasing element. In some embodiments, the pre-loaded biasing element has a variable biasing force vs. displacement curve. For example, the pre-loaded biasing element may include a camming mechanism or other linkage that allows the force to first decrease and then increase again, or the force to first increase and then decrease.

In some embodiments, the pre-load value of the biasing element is equal to or greater than the mating force value. In such an example, when a connecting force is applied to push the first connector and the second connector toward one another, the first connector of the quick disconnect and the second connector of the quick disconnect may fully mate before the pre-loaded biasing element allows the fully mated quick disconnect to move relative to the housing.

In another embodiment, where the pre-load value of the biasing element is less than the mating force value, the applied connecting force may, at first, move the first connector of the quick disconnect relative to the housing until the force generated by the biasing element is greater than the mating force value, at which point the first connector of the quick disconnect and the second connector of the quick disconnect will mate. Any additional force applied to this system, after the first connector of the quick disconnect and the second connector of the quick disconnect have fully mated, may then further move the mated quick disconnect system relative to the housing.

In some embodiments, the pre-loaded biasing element is a magnet. For example, the pre-loaded biasing element may be a first magnet having its positive pole against the first connector of the quick disconnect, wherein the first connector of the quick disconnect may have a second magnet having its positive pole against the first magnet. The resulting magnetic repulsion force may provide the pre-load of the biasing element and relative movement of the first and second magnets toward one another increases the repulsion force of the biasing element.

In yet another embodiment, the pre-loaded biasing element may be a compressible gas positioned between the back-part of the housing and the first connector of the quick disconnect. As the gas in the cylinder is compressed, the pressure in the cylinder increases, providing an increasing force from the biasing element.

In some embodiments, a pre-loaded biasing element is disposed in the second housing and applies a second biasing force between the second housing and the second connector of the quick disconnect. In some embodiments, there is a pre-loaded biasing element disposed in both the first housing and the second housing. For example, the pre-load value of the first biasing element in the first housing may be greater than the pre-load value of the second biasing element in the second housing allowing the second connector of the quick disconnect to move relative to the second housing before the first connector of the quick disconnect will move relative to the first housing.

While the biasing elements may allow some compensation for variations in the longitudinal position or dimensions of the quick disconnect and/or the structures to which the connectors of the quick disconnect are mounted, some embodiments of the present disclosure provide one or more mechanisms to compensate for variations in directions transverse to the longitudinal direction.

In some embodiments, a first connection assembly further includes a first guiding element configured to complementarily mate with a second guiding element to prevent displacement in x- and y-axis and only allow movement in z-axis (e.g., the longitudinal axis of the quick disconnect). The guiding elements may be considered to be mated after relative rotational movement and/or relative movement in x- and y-axis of the first connector and second connecter is prevented. For example, the guiding elements are configured to allow movement in the longitudinal direction and limit and/or prevent rotation or transverse movement of the first connector and second connector relative to one another. In one embodiment the first guiding element and the second guiding element may mate with each other before the first connector of the quick disconnect and the second connector of the quick disconnect mates. In another embodiment the first guiding element and the second guiding element may mate with each other at the same time as the first connector of the quick disconnect and the second connector of the quick disconnect mates.

In one embodiment, the first guiding element may be a guide pin and the second guiding element may be a guide hole. In another embodiment, the first guiding element may be a guide hole and the second guiding element may be a guide pin. In one embodiment the guide pin and the guide hole have asymmetric surface for preventing any rotational movement and/or movement in x- and y-axis. For example, the guide pin may be mostly cylindrical having one side flat and the guide hole may have identical structure to the guide pin. In yet another embodiment, the first and the second guiding elements may be cross-slotted guiding plates, wherein one is oriented horizontally, and the other is oriented vertically.

In some embodiments, systems and methods for providing a fluid connection for liquid cooling of electronic devices according to the present disclosure are described according to the sections below:

[A1] In some embodiments, an connection apparatus includes a housing having a front-part and a back-part, a first connector of a quick disconnect fluid conduit oriented toward the front-part of the housing and a pre-loaded biasing element disposed in the housing to apply a biasing force between the housing and the first connector of the quick disconnect, wherein the pre-loaded biasing element is configured to allow the first connector of the quick disconnect to move relative to the housing.

[A2] In some embodiments, the connection apparatus of [A1] includes a first guiding element fixed to the housing.

[A3] In some embodiments, the pre-loaded biasing element of [A1] or [A2] has a threshold wipe value at which a compression of the pre-loaded biasing element provides a biasing force equal to a mating force.

[A4] In some embodiments, the preloaded biasing element of any of [A1] through [A3] is at least one of a spring, a magnet, and a compressible gas.

[A5] In some embodiments, the pre-load value of any of [A1] through [A4] is configured to be at least equal to a mating force.

[A6] In some embodiments, the first connector of any of [A1] through [A5] includes a fluid valve.

[A7] In some embodiments, the first connector of any of [A1] through [A6] is a male connector.

[A8] In some embodiments, the connector apparatus of any of [A1] through [A7] includes a second connector of the quick disconnect configured to complementarily mate with the first connector of the quick disconnect.

[A9] In some embodiments, the connector apparatus of any of [A1] through [A8] includes a second pre-loaded biasing element disposed in a second housing to apply a second biasing force between the second housing and the second connector. The second pre-loaded biasing element is configured to allow the second connector of the quick disconnect to move relative to the second housing.

[B1] In other embodiments, a method for mating a quick disconnect is provided, receiving a connecting force to mate a first connector of a quick disconnect in a housing with a second connector of the quick disconnect, when the connecting force is at least equal to a mating force value, connecting the first connector of the quick disconnect with the second connector of the quick disconnect, and when the connecting force is greater than a pre-load value of a biasing element in the housing, connecting the first connector of the quick disconnect with the second connector of the quick disconnect thereby forming a mated quick disconnect, and wherein the mated quick disconnect moving relative to the housing while maintaining the connection with the mated quick disconnect.

[B2] In some embodiments, the pre-load value of [B1] is equal to or greater than the mating force value.

[B3] In some embodiments, the biasing element of [B1] or [B2] provides a longitudinal range of motion.

[B4] In some embodiments, the biasing element of [B3] provides a biasing force that changes based on a relative longitudinal position of the housing and the first connector in the longitudinal range of motion.

[B5] In some embodiments, the method of any of [B1] through [B4] includes allowing a first guiding element in the housing to mate with a second guiding element before the first connector of the quick disconnect mates with the second connector of the quick disconnect.

[B6] In some embodiments, the method of any of [B1] through [B5] includes a second pre-loaded biasing element in connection with the second connector of the quick disconnect in a second housing, wherein the second pre-loaded biasing element allows the mated quick disconnect to move relative to the second housing.

[B7] In some embodiments, the second pre-load value of the second pre-loaded biasing element of [B6] is at least equal to the first pre-load value of the first pre-loaded biasing element.

[B8] In some embodiments, the method of any of [B1] through [B7] includes flowing a cooling fluid through the mated quick disconnect.

[C1] In yet other embodiments, a system for forming a connection in a server rack includes a first connector of a quick disconnect configured in a housing, a second connector of the quick disconnect complementary configured to mate with the first connector of the quick disconnect to form a mated quick disconnect, and a pre-loaded biasing element positioned between the first connector of the quick disconnect and the housing, wherein the force provided by the pre-loaded biasing element is no less than mating force between the first connector of the quick disconnect and the second connector of the quick disconnect.

[C2] In some embodiments, the system of [C1] includes a first guiding element fixed to the housing and a second guiding element. The first guiding element is configured to mate with the second guiding element.

[C3] In some embodiments, the mated quick disconnect of [C1] or [C2] forms a conduit through the first connector of the quick disconnect and the second connector of the quick disconnect, and the system includes a cooling fluid positioned in the fluid conduit.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An apparatus, comprising:
   a housing having a front-part and a back-part;
   a first connector of a quick disconnect fluid conduit oriented toward the front-part of the housing;
   a pre-loaded biasing element disposed in the housing to apply a biasing force in a longitudinal direction between the housing and the first connector of the quick disconnect fluid conduit, wherein the pre-loaded biasing element is configured to allow the first connector of the quick disconnect fluid conduit to move relative to the housing; and
   means for allowing movement in the longitudinal direction and limiting rotation of the first connector and a second connector relative to one another separate from the housing.

2. The apparatus of claim 1, wherein the pre-loaded biasing element has a threshold wipe value of ±7 mm at which a compression of the pre-loaded biasing element provides a biasing force equal to a mating force.

3. The apparatus of claim 1, wherein the pre-loaded biasing element is at least one of a magnet and a compressible gas.

4. The apparatus of claim 1, wherein a pre-load value of the pre-loaded biasing element is configured to be at least equal to a mating force, the pre-load value of the pre-loaded biasing element is between 50N and 100N.

5. The apparatus of claim 1, wherein the first connector includes a fluid valve.

6. The apparatus of claim 1, wherein the first connector of a quick disconnect is a male connector.

7. The apparatus of claim 1, the means for allowing movement in the longitudinal direction and limiting rotation of the first connector and a second connector relative to one another includes a first guiding element fixed to an exterior of the housing and extending parallel to the first connector.

8. The apparatus of claim 7, wherein the first guiding element is a guide pin or a guide hole having a rotationally asymmetric surface.

9. The apparatus of claim 1, wherein the second connector of the quick disconnect fluid conduit is configured to complementarily mate with the first connector of the quick disconnect fluid conduit.

10. The apparatus of claim 9, further including a second pre-loaded biasing element disposed in a second housing to apply a second biasing force between the second housing and the second connector, and wherein the second pre-loaded biasing element is configured to allow the second connector of the quick disconnect to move relative to the second housing.

11. A method for mating a quick disconnect, the method comprising:
    receiving a connecting force to mate a first connector of a quick disconnect in a housing with a second connector of the quick disconnect;
    when the connecting force is at least equal to a mating force value, mating the first connector with the second connector; and
    when the connecting force is greater than a pre-load value of a biasing element in the housing, moving the mated quick disconnect relative to the housing while maintaining the connection of the mated quick disconnect, wherein the biasing element has a threshold wipe value of ±7 mm at which a compression of the biasing element provides a biasing force value equal to a mating force value.

12. The method of claim 11, wherein the pre-load value is equal to or greater than the mating force value.

13. The method of claim 11, further including mating a first guiding element in the housing with a second guiding element before the first connector of the quick disconnect mates with the second connector of the quick disconnect.

14. The method of claim 11, further comprising flowing a cooling fluid through the mated quick disconnect.

15. The method of claim 11, wherein the biasing element provides a longitudinal range of motion.

16. The method of claim 15, wherein the biasing element provides a biasing force that is constant based on a relative longitudinal position of the housing and the first connector in the longitudinal range of motion.

17. The method of claim 11, further including a second pre-loaded biasing element in connection with the second connector of the quick disconnect in a second housing, wherein the second pre-loaded biasing element allows the mated quick disconnect to move relative to the second housing.

18. The method of claim 17, wherein a second pre-load value of the second pre-loaded biasing element is at least equal to the first pre-load value of the first pre-loaded biasing element.

19. A system for forming a fluid connection, the system comprising:
    a first connector of a quick disconnect configured in a server housing;
    a second connector of the quick disconnect in a server rack complementary configured to mate with the first connector of the quick disconnect in the server housing to form a mated quick disconnect;
    a pre-loaded biasing element positioned between the first connector of the quick disconnect and the server housing, wherein the force provided by the pre-loaded biasing element is no less than mating force between the first connector of the quick disconnect and the second connector of the quick disconnect; and
    a first guiding element fixed to the server housing and separate from the server housing to allow movement in the longitudinal direction and limit rotation of the first connector and the second connector relative to one another.

20. The system of claim 19, further including a second guiding element fixed to the server rack, wherein the first guiding element is configured to mate with the second guiding element.

21. The system of claim 19, wherein the mated quick disconnect forms a fluid conduit through the first connector of the quick disconnect and the second connector of the quick disconnect and further comprising a cooling fluid positioned in the fluid conduit.

* * * * *